April 16, 1968 D. DINELLA ETAL 3,377,699

FLUIDIZED BED COATING A CORE CONTAINING METAL BOARD, INCLUDING CIRCUIT FORMING, CORE WIRING AND CONNECTING STEPS

Filed May 3, 1965 3 Sheets-Sheet 1

INVENTORS: D. DINELLA
B. KIRSCHENBAUM
E.F. SCHUTZ
BY Leo Stanger
ATTORNEY

United States Patent Office 3,377,699

Patented Apr. 16, 1968

3,377,699

FLUIDIZED BED COATING A CORE CONTAINING METAL BOARD, INCLUDING CIRCUIT FORMING, CORE WIRING AND CONNECTING STEPS

Donald Dinella, Clark, Bernard Kirschenbaum, Elizabeth, and Eckart F. Schutz, Menlo Park, N.J.; said Dinella and said Schutz assignors to Western Electric Company, Incorporated, and said Kirschenbaum assignor to Bell Telephone Laboratories, Incorporated, both of New York, N.Y., both corporations of New York Filed May 3, 1965, Ser. No. 452,532
5 Claims. (Cl. 29—626)

This invention relates to printed circuits, particularly those incorporating magnetic memories wherein apertured magnetic cores retain information imparted to them momentarily by magnetically interlinked current-carrying windings.

In such printed circuits a number of disk-shaped ferrite cores with center apertures are glued edgewise into individual slots on a printed circuit board, and enamel-insulated wires connected to printed wiring on the board are threaded through the core apertures to link the cores magnetically. However, ferrite cores glued into position are deficient in having only limited strength and ability to endure shock. They are liable to break when struck by a test instrument or when the system of which they form a part is subjected to shock or the like. Where the printed circuit boards comprise epoxy-coated metal substrates, which are generally strong, the cores represent comparatively weak, brittle members. Moreover, the necessary gluing of cores into slots is a wasteful operation.

Also, thees disk-shaped cores have sharp edges that during threading of the cores may scrape the enamel off the wires threaded therethrough and cause short circuits. Avoiding such short circuits by rounding the core edges or covering the cores with a smooth insulating coating involves a costly and wasteful extra step during manufacture. Moreover, such coatings are difficult to apply without adversely affecting the uniformity of the core dimensions and thus the predictability of the core positions on the board. Actually, such departures in the desired positions of the cores often matters little where the cores are hand-threaded. However, with mechanized threading, the position of a core, particularly its aperture, is critical, and accurate registration is necessary.

The problem of registering coated cores is even further aggravated where the printed circuit board comprises an epoxy-coated metal substrate. Here the variations in the epoxy coating itself affect the accuracy of alignment of the cores. The additional coating makes the condition worse.

An object of this invention is to improve printed circuits, particularly to improve the method and the means for mounting apertured cores on printed circuit boards.

Another object of the invention is to obviate the danger of the cores scraping the windings and causing shorts thereby.

Another object of the invention is to assure firm seating of the cores upon the printed circuit boards while nevertheless simplifying the core mounting operation and without requiring extra steps during manufacture.

Still another object of the invention is to avoid the step of applying a special adhesive to the cores so as to retain them in position.

Still another object of the invention is to accomplish the above while strengthening the cores.

Yet another object of the invention is to prevent the effects of humidity upon the performance of cores in memory systems.

According to the invention, these objects are achieved in whole or in part by press fitting the cores of a magnetic memory into the suitable slots of a prepunched substrate, preferably a metal substrate, and then covering both the substrate and the cores with a continuous layer of fluidized epoxy powder that also covers the walls of the apertures in the cores, such as by dipping in a fluidized bed, and then permitting the covering to harden so as to form a continuous plastic encapsulation of the plate and the cores. Suitable printed wiring is then added or applied onto the surface of the board. The printed circuit is completed by adding the components between the wiring, winding the plastic-coated cores, and connecting the components and the windings by solder dipping.

The continuous coating on the plate and the cores not only bonds the cores to the plate without a step requiring extra adhesive but also insulates the cores with a smooth coat whose edges are rounded and permit mechanized wiring techniques. The coating encapsulates the cores and strengthens them.

These and other features of the invention are particularly pointed out in the claims forming a part of this specification. Other objects and advantages of the invention will be mentioned or will become obvious from the following detailed description when read in light of the accompanying drawings wherein:

Figure 1:
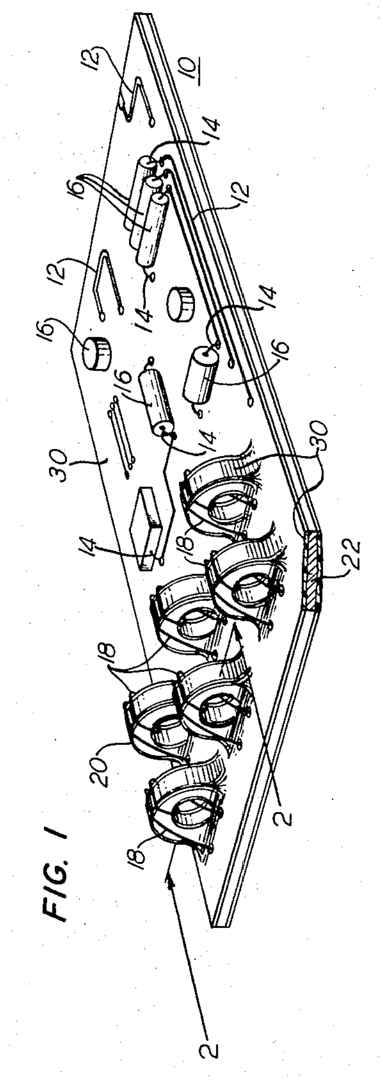
FIG. 1 is a perspective, partially cut-away view of a printed circuit board embodying features of this invention.

In FIG. 1 a printed circuit board 10 comprises a number of printed wiring paths 12 connecting the leads 14 of a plurality of circuit components 16. Wiring paths 12 also appear on the underside (not shown) of the board 10 and connect leads 14 to the windings 18 magnetically linking six ferrite memory cores 20. The windings 18 serve to magnetize or demagnetize the particular cores 20 according to currents supplied to the windings 18 through the components 16. The cores 20 by virtue of their retentivity store the information imparted by the windings 18 even after currents cease flowing in the wires. The use of such memories in storage systems is well-known.

Figure 2:
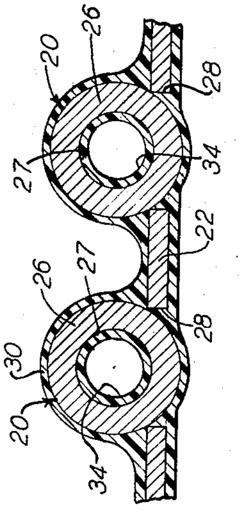
FIG. 2 is a section 2—2 of FIG. 1.

The board 10 is constructed of a steel plate 22 forming a substrate that has been punched to permit easy passage of the windings 18 and the leads 14 to the opposite side of the board where necessary. As shown in FIG. 2, each of the six cores 20 comprises a disk-shaped ferrite core member 26 having a central aperture 27 and press fitted into slot 28 on the plate 22. Covering the core members 26 as well as the plate 22 is a single continuous epoxy resin coating 30.

Figure 3:
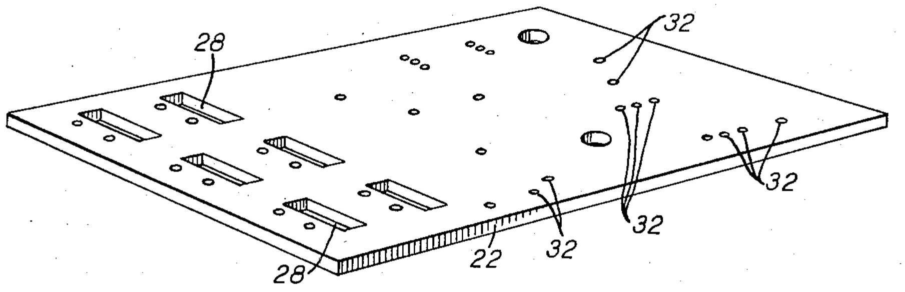
FIG. 3 is a perspective view of a plate forming the substrate of the printed circuit board in FIG. 1.

The circuit board in FIG. 1 is first formed as shown in FIG. 3 by drilling or punching a number of holes 32 in the plate 22 at suitable locations that will ultimately allow passage of leads from one to the other side of the circuit board 10. The holes 32 are sufficiently large to allow passage of leads 14 and windings 18 even after the hole walls are covered with epoxy resin. Six elongated slots 28 are punched for seating of the members 26. Before seating the members 26, and as a preliminary to a coating operation, the plate 22 is degreased. It is also surface treated in a solution of alkali etch.

Figure 4:
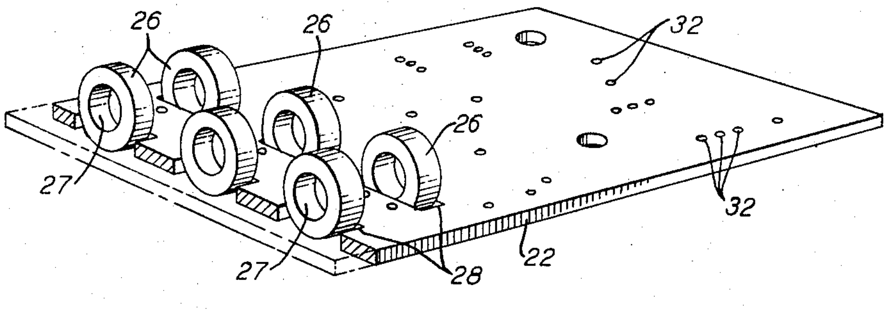
FIG. 4 is a perspective view of a core-plate assembly in FIG. 1.

The core members 26 are then pressed fitted into the slots 28 either manually or mechanically to produce the structure of FIG. 4. The structure of FIG. 4 is then coated with an epoxy resin.

This coating operation involves heating the prepared plate 22 and press fitted core members 26 to between 450° F. and 500° F. in an oven, and upon reaching the proper temperature applying the epoxy resin onto the metal and the cores. The resin application may be made by means of a spray, but preferably by dipping the heated plate and cores into a fluidized bed of epoxy powder, where a slowly rising air flow expands the volume of a mass of epoxy powder by suspending its particles. The suspended epoxy resin builds up a coating on the walls of the holes 32 and in the apertures 27 of the ferrite members 26. The apertures 27 form crescent-shaped openings 34 with peripheral edges that are rounded and smoothly contoured. It takes approximately three seconds to build a 15-mil coating.

After the epoxy coating has been applied, the assembly is cured, if required, in an oven at about 400° F. for approximately fifty minutes. The resulting structure appears in FIG. 5. The above-described coating operation is disclosed in more detail in the patent application of D. Dinella, Ser. No. 220,383, filed Aug. 30, 1962, and now abandoned and assigned to the assignee of D. Dinella in this application.

Preferably, the before-mentioned step of dipping the plate 22 and core members 26 into a fluidized bed takes place in a tank vibrating at 3,600 cycles per second over a 1/16-inch amplitude, wherein bed ambient air heated to 75° F. to 110° F. and traveling upward at a rate of 6 to 7.5 cubic feet per minute imparts an "up-across-down-across" circulating flow of two inches or more per second to a powdered epoxy resin and suspends it at a density of between 16 to 28 pounds per cubic foot. For best results the tank is placed at an angle of 1° to 3° in the direction of the across flow. After coating and before curing, a high-velocity air spray is concentrated on the cores 20 in the axial direction to remove excess powder in their apertures 26. Generally, the fluidized bed process of dipping the plate is disclosed in United States Patents 2,814,489, 2,974,059, and 3,090,696.

Printed wiring paths 12 are now applied to the surface of the epoxy coating 30 by abrading its surface with a sand spray, seeding and sensitizing the epoxy coating with a stannous chloride and palladium chloride solution to catalyze the surface, depositing a thin copper layer on the board surface in an electroless solution, applying on the board a mask whose openings define a circuit, electroplating the unmasked portion of the electroless-deposited copper to form the circuit, electroplating gold or solder onto the electroplated copper to form a nonoxidizing coating, removing the mask, and then removing the electroless layer between conductors by etching. This printing operation is also described in detail in the before-mentioned Dinella application Ser. No. 220,383, filed Aug. 30, 1962 and now abandoned.

The board 10 having cores 20 and suitable holes 32 for component leads 14 to pass through the board results from this operation. The structure of FIG. 1 is completed by inserting the leads 14 of the components 16 through the epoxy coated holes 32, threading the cores 20 with the proper windings 18, and then connecting the windings 18 and the leads 14 to the proper printed wiring paths 12 by dipping the underside of the board 10 in a solder bath.

The board 10 with its encapsulated ferrite cores 20 is particularly susceptible to mechanized threading with the core windings disclosed in the copending application of B. S. Hoagland-B. Kirschenbaum Ser. No. 452,773 filed May 3, 1965, now U.S. Patent No. 3,328,782, issued June 27, 1967. There a laminate structure comprising several conductive layers separated by insulating layers passes through the aperture of the core to form a single winding. Because the laminate structure is comparatively stiff, several such laminate structures can form parallel fingers that extend from a laminate trunk. This is the structure shown in FIG. 6.

Figure 6:
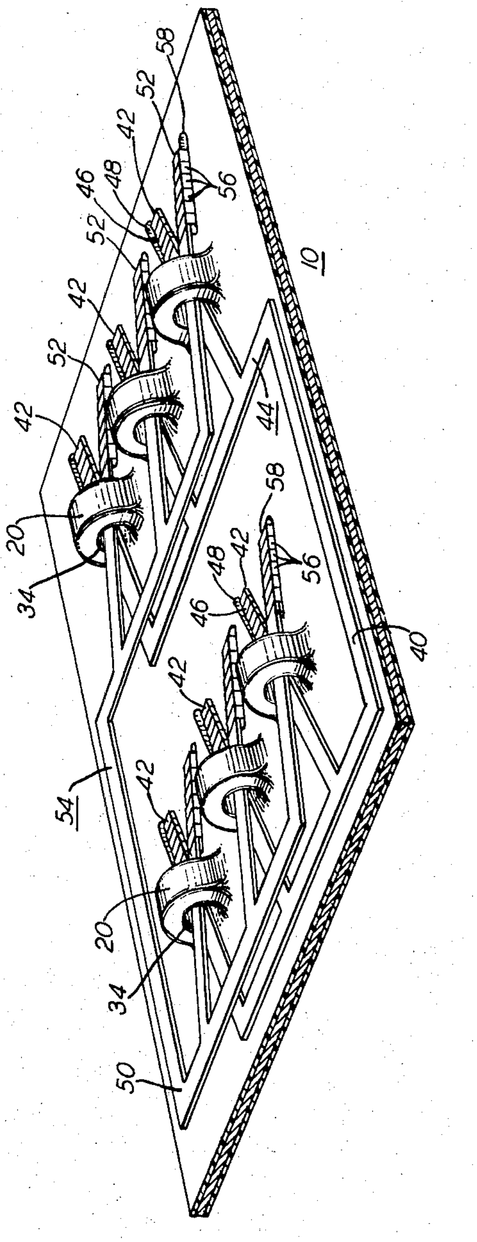
FIG. 6 is a perspective view of a printed circuit board embodying features of the invention having windings applied according to another feature of the invention.

In FIG. 6 the board 10 having the cores 20 supports on its upper surface a C-shaped laminate trunk 40 having six parallel fingers 42 to form a single laminate structure 44. The laminate structure 44 comprises six overlying layers bonded together. Each layer in turn comprises one conductive metal foil and one insulating Mylar film to which it is bonded. Each foil-Mylar layer extends throughout the trunk 40. Each foil-Mylar layer terminates in the fingers 42 at respective angular offsets 46 spaced along the fingers. The offset 46 on each layer projects through slits 48 on the printed circuit board 10 to the other face of the board, where the metallic foil is solder-connected to terminals on the printed wiring on the face of the board 10. The parallel fingers 42 project angularly from the trunk 40.

A second trunk 50 corresponding to the trunk 40 also lies on the board 10. It forms with respective fingers 52 a second laminate structure 54. The fingers 52 project angularly from the trunk 50 but in the direction crossing the fingers 42. The trunk 50 with its fingers 52 are otherwise identical to the trunk 40 with its fingers 42. In each of its Mylar-foil layers in the fingers 52, the foil terminates in respective offsets 56 that project through respective slits 58 to the other side of the board 10 where the metallic foil is solder connected to terminals on the printed wiring on the underface of the board 10.

The laminate windings associated with the cores 20 in FIG. 6 are particularly easy to thread onto the cores 20 by virtue of the rounded corners that characterize the epoxy coating of the cores. When an automatic machine passes the fingers 52 or any other windings through the cores 20 on the board 10, it is essential that the apertures 34 of the cores be at substantially the same or at least predictable level so as to assure easy entrance for the fingers. Such uniformity or predictability of aperture level is afforded here because it is the bare ferrite core members 26, whose dimensions are accurately predictable within limited tolerances, that sit in the accurately machinable slots 28 of the bare plate 22. Were either the ferrite core members 26 or the plate 22 coated with an insulating coating prior to seating of the cores, only the most accurate application of the coating would assure the type of alignment available according to the invention. In many cases it is preferable that the slot dimensions are such as to seat the press fitted cores 26 so that the lower edges of apertures 27 are flush with or dip just below the metal 28. The contact between the core members 26 and the plate 22 affects the magnetic characteristics of the core members only slightly. Simple preadjustment of the currents passing through the windings compensates for these contacts.

The structures of FIGS. 1, 2, and 6 provide a simple printed circuit board having apertured memory cores of supplemented mechanical strength whose corners are not only blunted but are actually shaped to guide the windings into their apertures. The structure assures accurate registration for mechanized threading and eliminates the need to hold the cores by extra adhesives.

Figure 5:
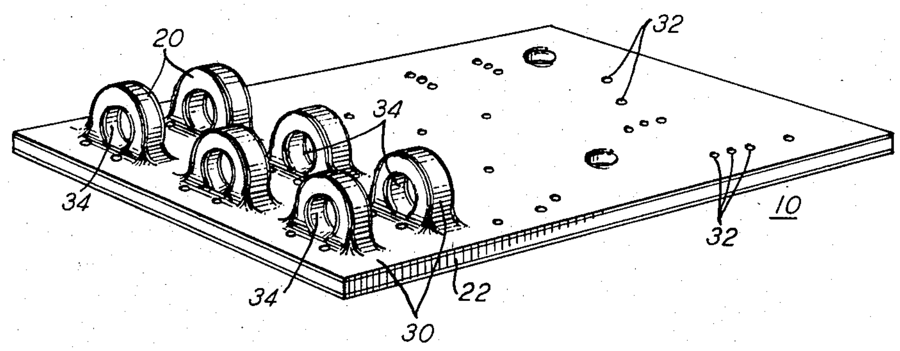
FIG. 5 is a perspective view of a printed circuit board having an insulated plastic coating that embraces the cores of FIG. 4.

Moreover, curing the epoxy resin coating after its application so as to produce the structure in FIG. 5 not only solidifies the coating but also during solidification stores a certain amount of shrink energy therein by contracting it elastically. This shrink energy has the favorable effect of pressing the ferrite core members into the slots 28, thereby assuring more accurate placement of the core members while helping to absorb the energy of any shocks that may tend to dislodge the core members from their slots.

While embodiments of this invention have been described in detail, it will be obvious to those skilled in the art that the invention may be embodied otherwise without departing from its spirit and scope.

What is claimed is:

1. The method of forming a printed circuit board, which comprises forming an opening in a metal plate, fitting an apertured magnetic core edgewise into said opening so that the aperture is exposed above one face of said plate, exposing said plate and said core to a fluidized bed of plastic powder and covering the plate and the surface of the aperture in said core while leaving a hole, permitting the fluidized powder to harden so as to form a coating on the plate and core forming printed wiring on said coating, threading said core with a conductor, and connecting the conductor to said wiring.

2. The method of forming a printed circuit board which comprises forming a plurality of openings in a metal plate, fitting a plurality of apertured magnetic cores edgewise into respective ones of said openings and into contact with said plate and so that the cores project radially over a surface of said plate and expose the apertures and so that the cores are spaced from one another, covering said plate and said cores including the surfaces of the apertures of said cores with a fluidized bed of plastic powder while leaving a hole through each aperture and leaving a space between the powder covered cores, permitting the plastic powder to harden so as to form a coating on the plate and the cores, forming printed wiring on the surface of said coating, separately threading each of said cores with separate conductor portions, and connecting the conductor portion to said wiring.

3. The method of forming a printed circuit board which comprises forming a plurality of openings in a metal plate, press fitting a plurality of apertured cores into the bare metal of the respective ones of said openings so that the cores project over a surface of said plate and expose the apertures and so that the cores are spaced from one another, exposing said plate and said cores to a fluidized bed of epoxy powder so that the powder covers the surfaces of apertures of said cores while leaving a hole through each aperture and leaving a space between the powder covered cores, permitting the epoxy powder to harden so as to form a coating on the plate and the cores forming printed wiring on said coating, separately threading each of said cores with separate conductor portions passing through each hole, and connecting the conductor portions to said wiring.

4. The method of forming a printed circuit board which comprises forming a plurality of openings in a metal plate, press fitting a plurality of apertured cores into respective ones of said openings so that the cores project over a surface of said plate and expose the apertures and so that the cores are spaced from one another, immersing said plate and said cores into a fluidized form of an epoxy resin powder so that the powder covers the surfaces of the apertures of said cores and forms round corners at the core edges by the apertures while leaving a hole through each aperture sufficiently large to permit entry of energizing conductors and leaving a space between the powder covered cores, and withdrawing the plate and cores so as to permit forming a plastic coating on the plate and the cores, curing the fluidized powder so as to shrink the plastic coating to store energy therein and thereby press said cores further into said openings forming printed wiring on said coating, separately threading each of said cores with separate conductors, and connecting the conductors to said wiring.

5. The method of forming a printed circuit board which comprises forming a plurality of rectangular openings in a metal plate, press fitting a plurality of toroidally-shaped magnetic cores having apertures edgewise into said openings while the metal is bare so that the cores project over a surface of said plate and expose the apertures and so that the cores are spaced from ane another, heating said plate and said cores, covering said plate and said cores with a fluidized form of an epoxy resin powder while leaving a hole through each aperture sufficiently large to permit entry of energizing conductors and leaving a space between the powder covered cores, and coating the plate and cores so as to form a plastic coating on the plate and the cores and so as to form round corners at the edges of the core by the apertures, forming printed wiring on said coating, separately threading each of said cores with separate conductor portions passing through each hole, and connecting the conductors to said wiring, whereby the coating at once holds the cores in the openings while forming round corners at the core edges by the apertures and forms a base for the printed wiring to which said conductors are connected.

References Cited

UNITED STATES PATENTS

| | | | |
|---|---|---|---|
| 3,296,099 | 1/1967 | Dinella | 204—15 |
| 3,261,707 | 7/1966 | Korski et al. | 117—18 |
| 3,136,650 | 6/1964 | Avila | 117—21 |
| 3,130,134 | 4/1964 | Jones | 29—155.5 |
| 2,997,776 | 3/1961 | Matter et al. | 29—155.57 |
| 3,179,854 | 4/1965 | Luedicke et al. | 317—101 |
| 3,196,522 | 7/1965 | Bernstein et al. | 340—174 |
| 3,214,273 | 10/1965 | Frantzen | 340—174 |

FOREIGN PATENTS 962,831 7/1964 Great Britain.

OTHER REFERENCES

IBM Technical Disclosure Bulletin, vol. 6, No. 3, August 1963, p. 64, TK 7800. I 13.

RCA Technical Notes, Issue No. 4, rec'd. in office Aug. 18, 1958, "Mounting for Magnetic Memory Cores," p. TN No. 190, TK 6554. R 2*t*.

JOHN F. CAMPBELL, *Primary Examiner.*

ROBERT K. SCHAEFER, *Examiner.*

R. W. CHURCH, W. C. GARVERT, *Assistant Examiners.*